2,751,628
Patented June 26, 1956

2,751,628

MOLDED ACETYLENIC POLYMER AND METHOD OF PRODUCTION

Gilbert B. Carpenter, Mountain Lakes, and Otis W. Fortner and Alio J. Buselli, New Providence, N. J., assignors to Air Reduction Company, Incorporated, New York, N. Y., a corporation of New York No Drawing. Application March 23, 1953,
Serial No. 344,216

11 Claims. (Cl. 18—55)

This invention relates to polyacetylene, sometimes called cuprene or carbene, and has for its object the production of useful molded articles from polyacetylene. The invention provides a method of molding polyacetylene by pressure and heat, and molded articles formed of polyacetylene.

Polyacetylene is a very light, voluminous, fibrous and insoluble solid. Because of its unusual physical and chemical properties, it has not been possible heretofore to mold this polymer according to conventional molding practices.

This invention is based upon the discovery that polyacetylene yields to pressures in excess of 15,000 p. s. i. at temperatures above about 320° C. and can be molded into dense, hard and strong articles of various shapes and for various purposes. Molding temperatures below 320° C. and pressures up to 25,000 p. s. i. have resulted only in lamellar structures. In accordance with the invention, the polyacetylene at a suitable initial temperature is subjected to a pressure in excess of 15,000 p. s. i., advantageously around 20,000 p. s. i., at a temperature above about 320° C. It is generally advantageous to use a low pressure of, say, 400 p. s. i. while the polymer is being heated and not to apply full pressure until the temperature is at least 150° C. Thereafter, the temperature is increased to an especially effective temperature, around 350° C., and the molding pressure in excess of 15,000 p. s. i. is held for around sixty minutes or more. Shorter periods give an unsatisfactory lamellar structure. A further important aspect of the invention is based upon the discovery that the molded article should be cooled to a temperature appreciably below the molding temperature if the molded article is released in air.

The amorphous polymer as initially formed may be molded in a practical manner according to the invention. However, for best results, the polymer is ground to a fine powder before molding. This may be done in a preferred practice by compressing the polymer to around 15,000 p. s. i. or more at a temperature of about 150° C. and then grinding the compressed article to a powder. Drastic chemical alteration of the virgin polymer can alter the molding characteristics significantly. For example, when the polymer is nitrated with concentrated nitric acid-sulfuric acid solution, the molding temperature can be lower. Mild chemical treatment does not significantly affect its molding properties. For example, if the polymer be refluxed with 0.01 N nitric acid, the molding properties are not appreciably changed. With 1.0 N nitric acid, there is more oxidation of the polymer than with the 0.01 N acid and articles so treated can be molded at a temperature in the range of 90°–110° C. Lubricants and plasticizers such as diphenyl sulfone, anthracene, and stearic acid have not increased the moldability of polyacetylene. Several good discs were molded using silicone oil as lubricant but the conditions as to pressure and temperature were also observed. The silicone oil prevents sticking to the mold. Polished molds prevent sticking without using a lubricant.

In carrying out a molding operation according to the invention, the polyacetylene, preferably in the form of powder, or non-coherent particles or masses, is inserted into the mold and heated to a temperature around 150° C. at a low pressure, say 400 p. s. i., and then the full pressure of around 20,000 p. s. i. is applied. The mold is maintained at molding pressure while heat is applied in any suitable way, for example, with top and bottom heating platens, and the heating is continued to maintain the molding temperature above 320° C., say, at around 350° C., for at least one hour, preferably about one and one-half hours. After about one hour at molding temperature, the temperature is decreased while holding the article at molding pressure. The article is most effectively cured while in the mold. If air is allowed to come in contact with the molded article while near the molding temperature when the mold pressure is released, charring occurs. It is advantageous to cool the mold below about 250° C. before releasing the pressure or to discharge the molded article into an inert gas atmosphere.

Elemental analyses of polyacetylene were carried out on five samples before and after molding. The changes in density of the polyacetylene resulting from the molding operation were measured according to the Archimedes Principle. Table I shows that the C/H ratio generally increases during molding, and the density generally increases approximately 35% in the untreated polymer and approximately 22% in the leached polymer. In polymerizing acetylene in the presence of a copper oxide catalyst varying amounts of copper-containing materials become dispersed throughout the polyacetylene mass. It is desirable for certain uses of the product that such contaminants be removed. An effective means for leaching the copper from polyacetylene is the use of 0.1 N nitric acid at its reflux temperature. Such density changes can be explained by the assumption that C—H bonds are transformed into C—C bonds, as the C/H ratios would indicate, and if carbon-carbon double bonds are converted to carbon-carbon single bonds.

*Table I*

| Leaching Treatment | C/H | | Density | |
|---|---|---|---|---|
| | Before Molding | After Molding | Before Molding | After Molding |
| Refluxed with 0.1 N HNO₃ | 1.23 | 1.31 | 1.06 | 1.29 |
| Unleached | 1.23 | 1.28 | 0.94 | 1.29 |
| Do | 1.27 | 1.31 | 0.92 | 1.29 |
| Do | 1.24 | 1.38 | | |
| Refluxed with 0.1 N HNO₃ | 1.24 | 1.32 | 1.01 | 1.27 |

The impact resistances of molded articles of polyacetylene were determined according to the A. S. T. M. Standards D256–47T, the Izod type test. The method of testing was followed explicitly with the exception that the test specimens were not conditioned.

The hardness of the molded polyacetylene and Bakelite shown in Table II was determined according to A. S. T. M. Standards D785–48T. The method of testing was followed explicitly with the exception that the test specimens were not conditioned. The hardness tests were made on the Rockwell R scale.

Table II

| Sample | Leaching Treatment | Impact Resistances, ft.lbs./in. of notch | Rockwell Hardness |
|---|---|---|---|
| Polyacetylene | Refluxed with 1 N HNO₃ | 1.5 | R 124 |
| Do | Unleached | 1.79 | R 125 |
| Do | do | | R 122 |
| Do | do | | R 125 |
| Do | Refluxed with 0.1 N HNO₃ | 1.02 | M 124 |
| Black Bakelite | | | R 118 |

The dielectric constant of molded polyacetylene is comparable to the methacrylates and hard rubber, better than the phenolics but not as good as polystyrene and polyethylene. Small changes in the copper content of polyacetylene samples synthesized under approximately the same conditions do not seem to affect the electrical properties materially as is illustrated by the table.

Table III

| Leaching Treatment | Percent Cu | Dielectric Constant (1 mc.) | Dissipation Factor (1 mc.) | D. C. Volume Resistivity at 100 volts |
|---|---|---|---|---|
| Unleached | 2.6 | 2.62 | 0.009 | 2×10¹² |
| Refluxed with 0.1 N HNO₃ | 0.48 | 3.02 | 0.015 | 7×10¹³ |
| Refluxed with 1 N HNO₃ | 0.12 | 3.54 | 0.025 | 6×10¹² |

From the investigations of the compression molding of polyacetylene and decopperized polyacetylene, there is evidence that it is a highly cross-linked polymer. No flow characteristics were observed during the molding process under conditions of pressure and temperature up to 60,000 p. s. i. and 400° C., respectively. Highly cross-linked polymers cannot flow even at high temperatures unless their primary valence bonds are broken. Extreme difficulties were encountered in the initial molding attempts due to the articles having lamellar structures and transverse cracks. Many of the early molded articles were brittle and could be cracked transversely under hand pressure. A possible explanation for this characteristic is that polyacetylene after molding has a tight three-dimensional network structure in which the connecting chains possess no flexibility of the type characteristic of a loose network. When such a tight network structure is deformed or subjected to stress, as in compression molding, the valence bonds and angles must be deformed.

During molding cross-linkage of the polymer chains can occur by rupture of neighboring C—H bonds followed by formation of the corresponding C—C bonds which results in a loss of hydrogen. From the densities and C/H ratios before and after molding it is not possible to determine the exact nature of the cross-linking reaction. Because the upper limit of its thermal stability range and the lower limit of its molding range are approximately coincident, it seems that molding occurs because C—H bonds are converted to C—C bonds. Since the oxygen stability of the molded polyacetylene is about the same as that of the unmolded polymer, it appears that most of the reactive double bonds do not take part in the reactions which lead to cross-linkage during molding.

We claim:

1. The method of molding polyacetylene which comprises compressing polyacetylene in a mold at a temperature of from about 320° C. to about 400° C. under a pressure of at least 15,000 p. s. i. and for at least about one hour, and preventing oxidation of the resulting molded article while cooling to the ambient temperature.

2. In the method of claim 1, using a molding temperature of around 350° C.

3. In the method of claim 1, using a pressure of around 20,000 p. s. i. for at least a part of the molding period.

4. In the method of claim 1, incorporating a silicone oil into the polyacetylene to serve as a lubricant to prevent sticking of the article to the mold.

5. In the method of claim 1, compressing previously compressed and granular polymer.

6. The method of molding polyacetylene which comprises compressing polyacetylene in a mold at a temperature of about 150° C. under a pressure of at least 15,000 p. s. i., grinding the compressed polymer to a powder, compressing the powder in a mold at a pressure of at least 15,000 p. s. i. at a temperature of from about 320° C. to about 400° C. for at least one hour, and preventing the resulting molded article from oxidizing while cooling it.

7. In the method of claim 6 holding the molded article under pressure while cooling it.

8. In the method of claim 6 removing the molded article from the mold while at molding temperature into an inert atmosphere.

9. The method of molding polyacetylene which had been treated with about 1.0 N nitric acid which comprises compressing the polyacetylene in a mold at a temperature of from 90° to 110° C. under a pressure of about at least 15,000 p. s. i., and preventing oxidation of the resulting molded article while cooling to the ambient temperature.

10. Molded articles of polyacetylene characterized by a C/H ratio of from 1.28 to 1.38 after molding and density after molding of from 1.27 to 1.29.

11. The method of molding polyacetylene which comprises compressing the polyacetylene in a mold at a temperature within the range of from about 90° C. to about 400° C., said temperature being selected sufficient to effect a chemical transformation of carbon-hydrogen bonds in the polyacetylene to carbon-carbon bonds without complete carbonization under a pressure of at least 15,000 p. s. i. for at least one hour, and preventing oxidation of the resulting molded article while cooling to the ambient temperature.

References Cited in the file of this patent

UNITED STATES PATENTS

| 1,828,560 | De Liefde | Oct. 20, 1931 |
| 2,232,475 | Renfrew et al. | Feb. 18, 1941 |
| 2,602,962 | Deakin | July 15, 1952 |

OTHER REFERENCES

Ellis: The Chemistry of Synthetic Resins, vol. 1, 1935, Reinhold Publishing Corp., pp. 142–147.